(12) United States Patent
Wang et al.

(10) Patent No.: US 9,167,529 B2
(45) Date of Patent: Oct. 20, 2015

(54) CONTROL OF ACTIVATION OF LOCATION-RELATED SENSORS OF A MOBILE DEVICE

(71) Applicants: Chenyu Wang, Mountain View, CA (US); Jun Yang, Milpitas, CA (US); Sam Song Liang, Palo Alto, CA (US)

(72) Inventors: Chenyu Wang, Mountain View, CA (US); Jun Yang, Milpitas, CA (US); Sam Song Liang, Palo Alto, CA (US)

(73) Assignee: Alohar Mobile Inc., Palo Alto, CA (US)

( * ) Notice: Subject to any disclaimer, the term of this patent is extended or adjusted under 35 U.S.C. 154(b) by 140 days.

(21) Appl. No.: 13/907,863

(22) Filed: Jun. 1, 2013

(65) Prior Publication Data

US 2013/0324196 A1 Dec. 5, 2013

Related U.S. Application Data

(63) Continuation-in-part of application No. 13/655,326, filed on Oct. 18, 2012.

(60) Provisional application No. 61/654,894, filed on Jun. 3, 2012.

(51) Int. Cl.

| H04W 24/00 | (2009.01) |
|---|---|
| H04W 52/02 | (2009.01) |
| G01S 19/34 | (2010.01) |
| G06F 9/00 | (2006.01) |
| G06F 1/00 | (2006.01) |
| H04M 1/725 | (2006.01) |
| G06F 1/32 | (2006.01) |
| H04W 52/28 | (2009.01) |
| H04W 4/02 | (2009.01) |

(52) U.S. Cl.
CPC ........... *H04W 52/0254* (2013.01); *G01S 19/34* (2013.01); *G06F 1/00* (2013.01); *G06F 1/325* (2013.01); *G06F 1/3215* (2013.01); *G06F 9/00* (2013.01); *H04M 1/72572* (2013.01); *H04W 52/283* (2013.01); *H04M 2250/12* (2013.01); *H04W 4/02* (2013.01); *Y02B 60/50* (2013.01)

(58) Field of Classification Search
USPC .......... 455/456.1, 456.2, 456.3, 456.5, 456.6, 455/574
See application file for complete search history.

(56) References Cited

U.S. PATENT DOCUMENTS

| 5,592,173 | A | 1/1997 | Lau et al. |
|---|---|---|---|
| 6,917,940 | B1 | 7/2005 | Chen et al. |
| 6,975,873 | B1 | 12/2005 | Banks et al. |
| 7,483,946 | B2 | 1/2009 | Boyd |
| 8,022,870 | B2 | 9/2011 | Malaney |
| 8,072,379 | B2 | 12/2011 | Gopinath |
| 8,195,192 | B2 | 6/2012 | Chow et al. |
| 8,588,810 | B2 * | 11/2013 | Dai et al. .................... 455/456.1 |
| 2003/0040946 | A1 | 2/2003 | Sprenger et al. |

(Continued)

OTHER PUBLICATIONS

1. Z. Zhuang, K.-H. Kim, J. P. Singh, "Improving energy efficiency of location sensing on smartphones", MobiSys 2010, Proceedings of the 8th international conference on Mobile systems, applications, and services.

*Primary Examiner* — Blane J Jackson
(74) *Attorney, Agent, or Firm* — Brian R. Short

(57) ABSTRACT

Methods, systems and apparatuses for selecting which of a plurality of sensors to use for location detection of a mobile device are disclosed. One method includes activating lowest-power location-related sensors of the mobile device at power up of a mobile device, and activating medium-power location-related sensors of the mobile device upon detection of motion of the mobile device and/or a change in a wireless connection to the mobile device.

18 Claims, 5 Drawing Sheets

(56) References Cited

U.S. PATENT DOCUMENTS

| | | |
|---|---|---|
| 2003/0176931 A1 | 9/2003 | Pednault et al. |
| 2007/0219706 A1 | 9/2007 | Sheynblat |
| 2008/0214210 A1 | 9/2008 | Rasenen et al. |
| 2008/0215557 A1 | 9/2008 | Ramer et al. |
| 2009/0163226 A1* | 6/2009 | Karkaria et al. ........... 455/456.1 |
| 2009/0177384 A1 | 7/2009 | Walder |
| 2010/0073201 A1 | 3/2010 | Holcomb et al. |
| 2010/0125406 A1 | 5/2010 | Prehofer |
| 2010/0250136 A1 | 9/2010 | Chen |
| 2011/0143777 A1 | 6/2011 | Kim et al. |
| 2011/0181517 A1 | 7/2011 | Orr et al. |
| 2011/0264940 A1 | 10/2011 | Lin et al. |
| 2011/0313649 A1 | 12/2011 | Bales et al. |
| 2012/0088519 A1 | 4/2012 | Agardh et al. |
| 2012/0201277 A1* | 8/2012 | Tanner et al. ................. 375/141 |
| 2014/0031061 A1* | 1/2014 | Thibault et al. ........... 455/456.1 |

* cited by examiner

CONTROL OF ACTIVATION OF LOCATION-RELATED SENSORS OF A MOBILE DEVICE

RELATED APPLICATIONS

This patent application claims priority to U.S. Provisional Patent Application No. 61/654,894, filed Jun. 3, 2012, and is a continuation-in-part of U.S. patent application Ser. No. 13/655,326, titled "CONTROLLING OPERATIONAL STATES OF A LOCATION SENSING SYSTEM OFA MOBILE DEVICE", filed Oct. 18, 2012, which claims priority to U.S. Provisional Patent Application Ser. No. 61/549,855 filed Oct. 21, 2011, which are herein all incorporated by reference.

FIELD OF THE DESCRIBED EMBODIMENTS

The described embodiments relate generally to location-based services. More particularly, the described embodiments relate to methods, systems and apparatuses for controlling activation of location-related sensors of a mobile device.

BACKGROUND

Location-based services have become more and more popular with the increasingly computing power of mobile devices and global positions system (GPS) sensor widely embedded into these devices, especially for smartphones. However, the continuous use of these applications drains device battery quickly as the GPS sensor (receiver) is a power-hungry sensor running at a few hundred mW. Due to the fact that mobile devices are battery powered, the reduction of power consumption location sensor is greatly desired.

It is desirable to have a method, apparatus and system for controlling activation of location-related sensors of a mobile device.

SUMMARY

An embodiment includes a mobile device. The mobile device includes one or more lowest-power location-related sensors, one or more medium-power location-related sensors, and a controller. For this embodiment, the controller is operative to activate at least one of the lowest-power location-related sensors of the mobile device at power up of the mobile device, and activate medium-power location-related sensors of the mobile device upon detection of a change in a wireless connection to the mobile device. For another embodiment, the medium-power location-related sensors of the mobile device are activated upon detection of a change in motion of the mobile device.

Another embodiment includes a method of selecting which of a plurality of sensors to use for location detection. The method includes activating lowest-power location-related sensors of the mobile device at power up of a mobile device, and activating medium-power location-related sensors of the mobile device upon detection of a change in a wireless connection to the mobile device. For another embodiment, the medium-power location-related sensors of the mobile device are activated upon detection of a change in motion of the mobile device.

Another embodiment includes a wireless location system. The wireless system includes an upstream server, and a mobile device electronically connected to the upstream server. The mobile device includes a controller, one or more lowest-power location-related sensors, and one or more medium-power location-related sensors. At least one of the upstream server and the controller are operative to activate at least one of the lowest-power location-related sensors of the mobile device at power up of the mobile device, and activate medium-power location-related sensors of the mobile device upon detection of a change in a wireless connection to the mobile device. For another embodiment, the medium-power location-related sensors of the mobile device are activated upon detection of a change in motion of the mobile device.

Other aspects and advantages of the described embodiments will become apparent from the following detailed description, taken in conjunction with the accompanying drawings, illustrating by way of example the principles of the described embodiments.

DETAILED DESCRIPTION

The described embodiments include methods, systems and apparatuses for determining user stays of a user of a mobile device. At least some of the described embodiments include an adaptive location-sensing framework that significantly improves the energy efficiency of smartphones running location-based applications. The underlying design principles of the proposed framework involve substitution, suppression, piggybacking, and adaptation of location sensing applications for conserving energy. At least some of the disclosed embodiments include a low-power consuming location sensor for obtaining location information and determining whether to enable a high-energy location-related sensor based on expected energy consumption.

Most popular mobile devices support background continuous location sensing tasks which consume lots of battery power. As a GPS sensor (receiver) consumes a large amount of power, lower power level sensors can be used to control powering the GPS sensor on and/or off. Monitoring signals from medium-power location-related devices for a long time still consumes a significant portion of battery, and only using low-power devices can result in higher false alarms, thereby inadvertently turning high-power location-related devices, such as, GPS on frequently. The described embodiments provide power conservation while still maintaining reliability of the location sensing of the mobile device.

Figure 1:
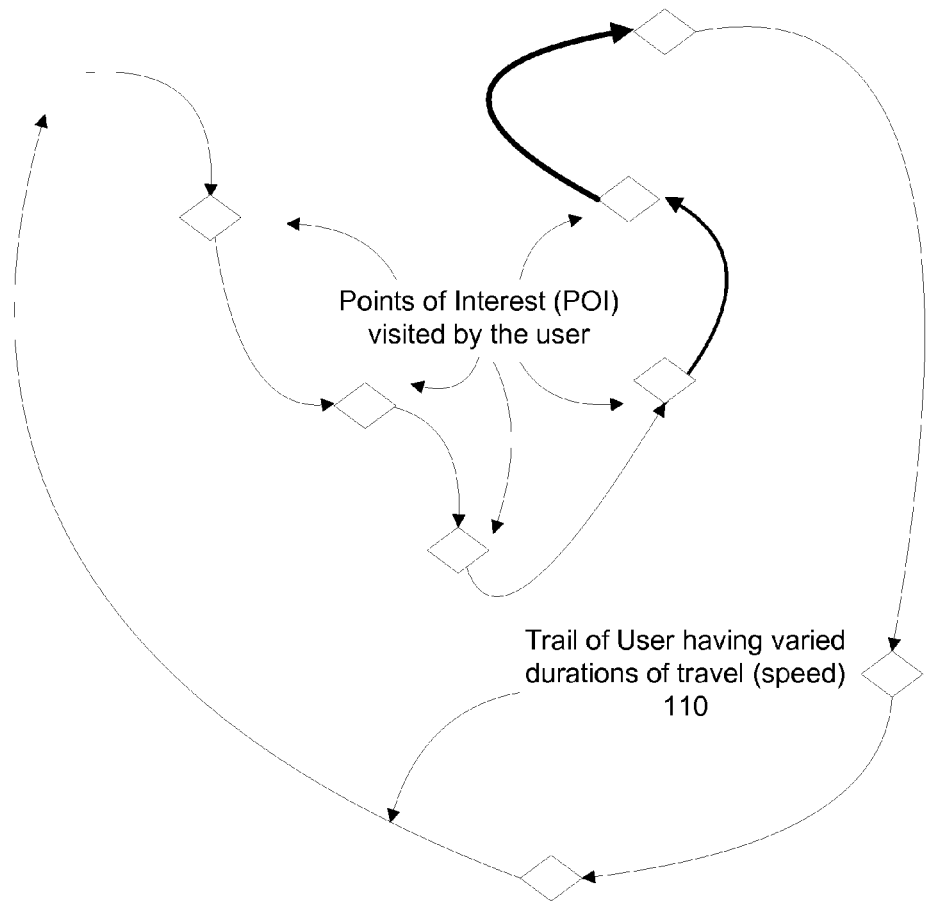
FIG. 1 shows an example of a map that depicts locations traveled by a user of a mobile device, according to an embodiment.

FIG. 1 shows an example of a map that depicts locations traveled by a user of a mobile device, according to an embodiment. A line 110 depicts the locations traveled by the user. During the travels of the user, the user visits various points of interest. Based on the visited locations, additional points of interest can be recommended and/or suggested to the user.

The locations traveled and the time spent at or between locations can be used to identify user stays of the user.

The trail of the user can be marked by differing speeds (depicted by varying thickness of the line 110) of travel between points of interest. The travel speed can be used as one piece of information in the determination of trails of interest.

A series of points of interest (such as shown in FIG. 1) can be termed a "trail of interest". The trail of interest includes a sequence of location data points. Embodiments of each location data point can include the attributes of latitude, longitude, altitude, speed and/or a timestamp. More specifically, an embodiment of a trail of interest is defined by a plurality of points of interest of the user. For an embodiment, a frequency and/or speed of the user between points of interest is used to determine a level of importance of the trail. For example, if a user travels along one part of a trail (or route) frequently, with low speed (meaning it is a local street, rather than high way, which can be verified by using a geo-database), then some types of services along the this part of the trail can be recommended to the user, with the expectation that it is more likely for the user to use the service, because it is easier for the user to stop by the service. For an embodiment, the level of importance is included within a user profile.

The route or trail of interest of the user of the mobile device typically includes stops to points of interest (POIs), wherein frequent or high power location-related sensors are not required to accurately determine the user's location while the user is visiting each POI. Some POIs provide an indication of more or less changes in location. As such, power consumption of the location-related sensors can be unnecessarily high, thereby unnecessarily using battery power of the mobile device of the user.

Figure 2:
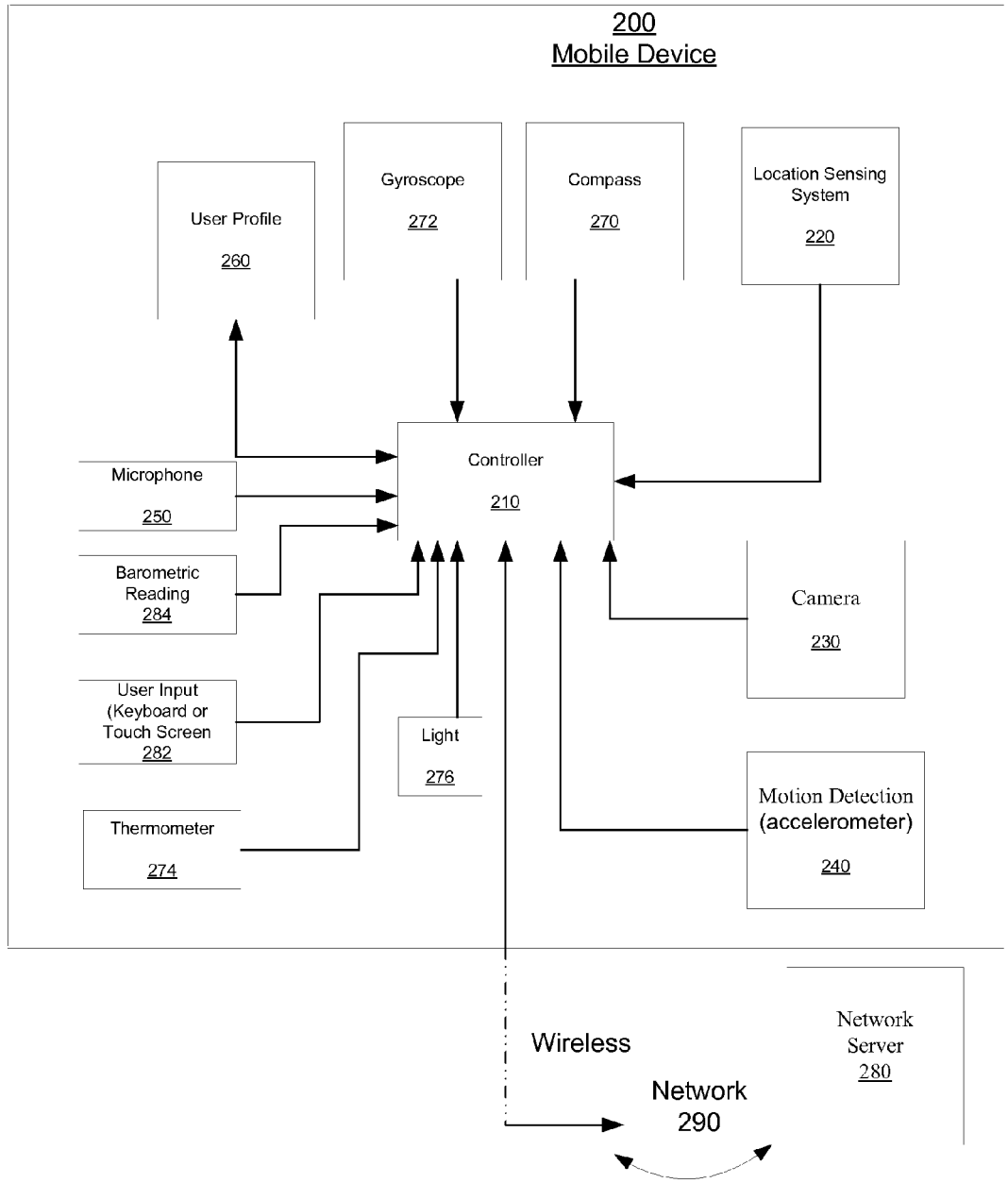
FIG. 2 shows a mobile device and an upstream server that the disclosed embodiments for controlling activation of location-related sensors of a mobile device are operable, according to an embodiment.

FIG. 2 shows a mobile device and an upstream server that the disclosed embodiments for controlling activation of location-related sensors of a mobile device are operable, according to an embodiment. For embodiments, user location data is continuously collected from the mobile device over time. The data can consist of multiple streams of sensor data with timestamps.

Spatial information (such as, longitude, latitude, altitude) of the user can be determined by a location sensing system, such as a global positioning system (GPS) 220 and/or network-based location, such as location determined by cellular and/or WiFi networks of the mobile device 200. Based on the spatial information, a controller 210 (or another controller connected to the controller 210) of the mobile device 200 can roughly determine locations of the user. GPS, however, can be limited because the exact location or the actual business (point of interest) visited by the user may not determinable from GPS alone. Embodiments provide alternate or additional pieces of location information as determined by the controller 210, or a controller electronically connectable to the controller 210.

Signals sensed by a motion sensor (for example, an accelerometer) 240 can be used to provide additional user-related information. That is, for example, the GPS 220 may be precise enough to narrow down the identification of a location of interest to three businesses. The signals generated by the motion sensor 240 can provide an indication of activity of the user, which can be used to additionally identify a location of interest. For example, when a department store (e.g. Walmart®) is located next to a cafe (e.g. Starbucks®), the user's motion pattern can be used to disambiguate between the two POI (points of interest), Walmart and Starbucks. If the user's motion pattern indicates that the user has been walking around most of the time, then the probability that the user visited the department store is higher. On the other hand, if the user's motion pattern indicates that the user has been sitting still most of the time, then the probability that the user visited the cafe is higher.

Images captured by a camera 230 of the mobile device 200 can be used to provide additional user-related information. That is, for example, signs on business proximate to the user's location can be used to determined points of interest.

Audio signals sensed by a microphone 250 of the mobile device 200 can be used to provide additional user-related information. That is, for example, loud noise versus quiet noise in the background of a user's location can be used to aid in determination of points of interest. For example, because the noise level in a library is usually low, if the noise level is low, then the probability that the user is in a library is higher than the probability that user is in a restaurant.

Direction of the user can be determined by, for example, a compass 270 of the mobile device 200. The compass 270 can provide present or historical directions of the user. The directions of the user can be used to aid in the determination of points of interest.

Rotation of the user can be determined by, for example, a gyroscope 272 of the mobile device 200. The gyroscope 272 can provide present or historical rotation of the mobile device of that the user carries. The rotation of the mobile device of the user can be used to aid in the determination of points of interest.

An ambient temperature of the user can be determined by, for example, a thermometer 274 of the mobile device 200. The thermometer 274 can provide present or historical ambient temperatures of the user. The temperature of the user can be used to aid in the determination of points of interest. For example, temperature can be used to determined whether the user is or was outside versus inside.

Exposure to ambient light by the user can be determined by, for example, a light sensor 276 of the mobile device 200. The light sensor 276 can provide present or historical light exposure of the user. The light exposure of the user can be used to aid in the determination of points of interest. For example, sensed levels of IR can be used to determine whether the mobile device of the user is, for example, in the user's pocket, and to determine whether the user is in direct sun light.

User-input information can be received from a key-board or touch screen 282. Based on a determination that the user is using the input (key-board or touch screen) behavior if the user can be inferred, and therefore, educated guesses can be made regarding the location of the user. For example, if the user is inputting information, the user is probably not driving. If the user is talking, the user is probably not at a movie theater.

Barometric information from a barometric sensor 284 can be sensed and used to determine user-related information. For example, the barometric information can be used to deduce an altitude of the user, and therefore, be used to determine what floor of a building the user is presently located. GPS can be inaccurate inside of buildings, and therefore, barometric information can be very useful.

A network 290 that the mobile device 200 is connected to, can provide additional user-related information. For example, a server 280 of the network can have street view images that provide additional information regarding a general location that a user is at. The connection to the remote server 280 is optional, because the mobile device may be disconnected from the server. In addition, part of the user profile 260 computation can be performed on the mobile device, and may not be required to be run on the server.

It is to be understood that the processing of the described embodiments for controlling activation of location-related sensors of a mobile device can occur at the controller 210, at the network server 280, or at a combination of both the controller 210 and the network server 280. If the connection of the network 290 allows the location information to be properly uploaded to the network server 280, then nearly all of the user stay processing can occur at the network server. However, if the connection of the network 290 is not available, at least a portion of the controlling activation of location-related sensors of a mobile device processing can occur at the controller 210 of the mobile device 200.

For at least some embodiments, one or more of the sensed states of a combination of the sensed states of the described sensors (220, 230, 240, 250, 270, 272, 274, 276, 282, 284) and/or network connectivity (290) are used in controlling activation of location-related sensors of a mobile device. The sensed states of the sensors change over time. That is, it is to be understood that any of the described embodiments can utilize any combination of the sensors of FIG. 2, or other sensors not listed for controlling activation of location-related sensors of the mobile device.

Figure 3:
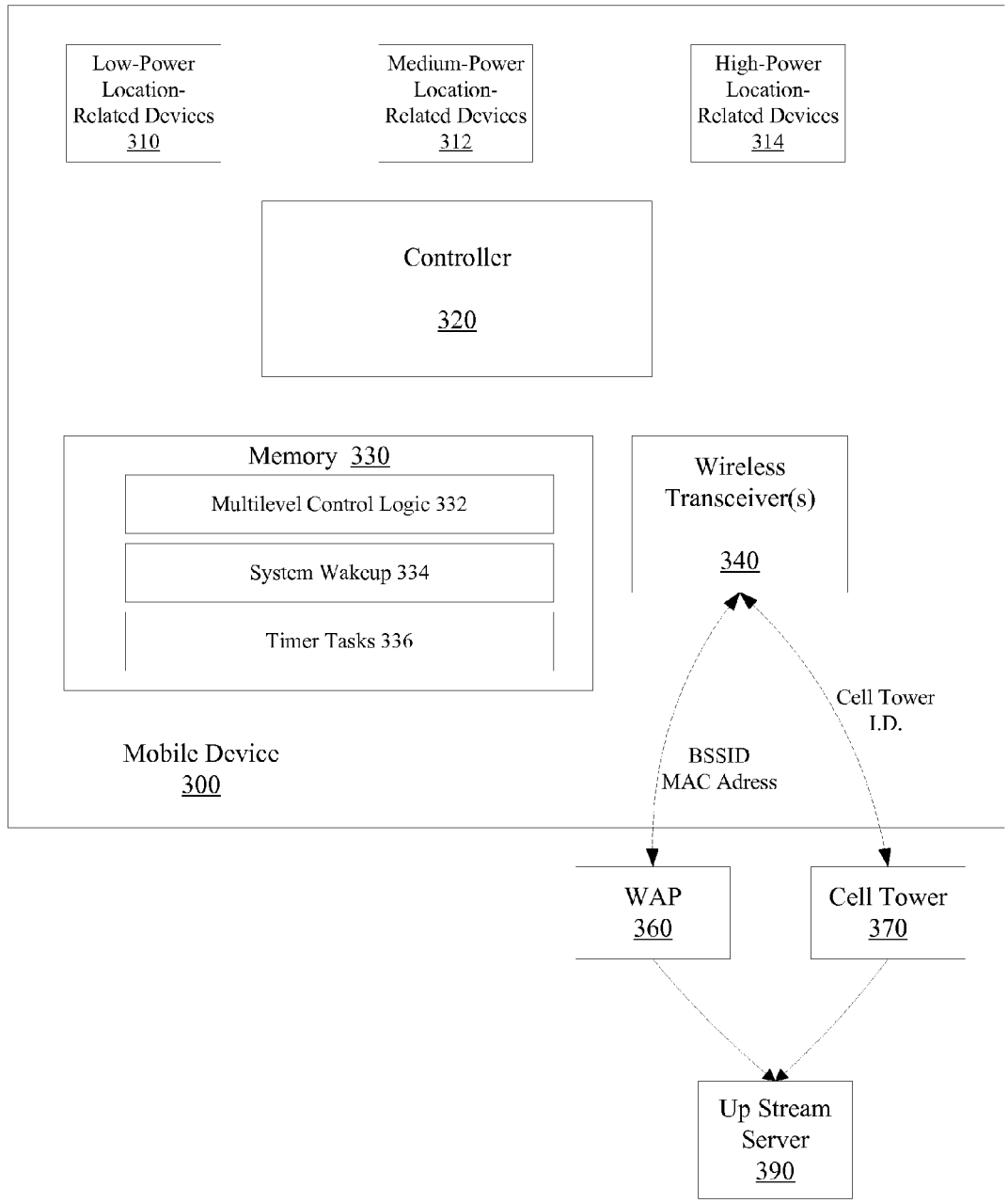
FIG. 3 shows a mobile device, according to an embodiment.

FIG. 3 shows a mobile device 300, according to an embodiment. As shown, the mobile device includes low-power location-related devices 310, medium-power location-related sensors 312, and high-power location-related sensors 314. As described, the three different types of device and/or processing consume different levels of power. Ideally, only the lowest power consuming devices (of the location-related devices) are operative that allow or provide the desired resolution and accuracy of location sensing. It is to be understood that a device can be representative of processing being performed, or of a physical device. While the described embodiments include three levels of power consuming location-related devices, it is to be understood that the described embodiments include N levels of power consuming location-related devices. The location-related devices being utilized is monitored and adjusted to provide as much location information as needed, while minimizing the power being consumed.

For an embodiment, the high-power location-related sensors include at least a GPS sensor (receiver). For at least some embodiments, the high-power location-related sensors include one or more of a GPS sensor, a gyroscope, a camera, a light sensor, and/or a barometric sensor. Additionally, or alternatively, the high-power location related sensing includes operating the frequency or speed of medium or low power sensors at a higher (above a threshold) rate or speed. That is, the lower-power location related sensors can be operable as high-power location-related sensors if operated, for example, at a higher sampling rate. Higher sampling rates generally result in more samples, which generally results in more processing, which generally results in greater power consumption.

For an embodiment, the medium-power location-related sensors include wireless access point (WAP) scanning and/or location and/or identification processing. Additionally, or alternatively, the medium-power location-related sensors include a compass. Additionally, or alternatively, the medium-power location-related sensing includes WiFi cell access point scanning, or more generally, WAP scan. Additionally, or alternatively, the medium-power location-related sensing includes higher power processing (high frequency sampling or faster processing) of the low-power sensors. Additionally, or alternatively, the medium-power location-related sensing includes location sensing (both WiFi and/or Cell tower).

For an embodiment, the low-power location-related sensors include a motion sensor, or cell-tower listener processing. For an embodiment, the motion senor includes an accelerometer. Additionally, or alternatively, the low-power location-related sensing WiFi cell tower connection processing. Additionally, or alternatively, the low-power location-related sensing includes sampling one or more of the sensors at a frequency of below a threshold frequency, thereby saving power. Additionally, or alternatively, the low-power location-related sensing includes zero frequency sampling. Zero frequency sampling includes, for example, listening (receiving and processing) and waiting for cell tower change as indicated by mobile device operating system.

At least some of the described embodiments include a multi-level system power management for continuous location sensing on mobile devices. Advantages of the disclosed embodiments include the use of low-power device (motion sensor) to wake up mobile system, wherein the mobile device may otherwise stay in a sleeping mode. Upon wakeup, the mobile device activates mid-power devices (WiFi scan or network location listener/collector), and turns on the highest power-consuming device last. Additional advantages of the disclosed embodiments include using low-power device for long running tasks (hours or days), and turning on mid-power devices for a short time (a few minutes) to allow for accurate decisions of when to turn on high-power device(s) or high-power location-related processing.

The described embodiments are implementable on various types of mobile devices, such as, Android® and iOS® devices.

For at least some embodiment that are implementable on Android® devices, low-power location-related sensors, such as accelerometer and cell ID listener (processing), are always running in the background, sensing user's motion movements and cell-tower level location changes. At least some embodiments include two system modes for running timing based tasks, which are used for medium-power location-related sensing (processing), such as WiFi scan and network location listener/collector. First, an inactive mode ("sleep" mode) that allows system sleep mode to save power when, for example, sampling rate can be slower when system sleep happens. Second, an active mode ("awake" mode) that does not allow system sleep mode and consumes some power.

For at least some embodiments, when motion is detected or there is a significant location change in a cell tower level, the system is switched from timer mode to alarm mode, thereby activating a WiFi scan and a network location listener. If a combination of low-power location related sensing and medium-power location-related sensing are used in the decision of whether to turn on GPS or not, once movement of less than a threshold is detected from motion sensor and there is no new WiFi network locations and or WiFi access signals becomes stable, the GPS sensor is turned off and the system goes to medium-power location-related sensing, or even further to low-power location related sensing.

At least some embodiments include a device "awake" mode and the previously mentioned device "sleep" mode. During the awake mode, the sampling of the location-related sensors is both more accurate and more reliable. The higher the frequency of sampling, the more accurate the samples are. The reliability is influenced or based on the standard deviation of the sampling frequency. The power consumed by the mobile device goes up as the sampling rate goes up. Further, the power consumed by the mobile device goes up as the reliability improves.

For the device awake mode, the sampling rate set to a first frequency—which is high—or higher than if no motion detected. After detecting motion, an embodiment includes increasing the reliability. That is, a standard deviation of the timing precision of the sampling frequency is reduced, which draw more power by increasing sensitivity of system to timing or frequency.

For at least some embodiment that are implementable on iOS devices, location service are always on but there are two parameters (distance and accuracy settings) to dynamically control the data quality of location data collected. For at least some embodiments, the data quality of location data collected is dynamically controlled by adjusting the frequency and accuracy of the sampling of the location-related sensors. High data quality can be obtained through GPS sensing, whereas, low data quality can be obtained, for example, through network location data.

For at least some embodiments, there are three different data quality of location data collected in terms of power consumption. First, a low-level data quality of location data collected includes detecting a low-power location-related sensor which includes, for example, a cell tower change. Second, a medium-level data quality of location data collected includes detecting, for example, a network location change or WiFi access point change at a higher rate. Third, a high-level data quality of location data collected includes detecting a GPS location change.

At least some embodiments include a dynamic controller, wherein the POI or place determination of the user of the mobile device influences the activation of high-power, medium-power and/or low-power location-related sensors. That is, the activation of the high-power, medium-power and low power location-related sensors is influenced depending upon a POI of the mobile device. The POI can be deduced based on the location and/or other information of the mobile device, or the POI can be input by the user of the mobile device.

An embodiment includes associating a Point of Interest (POI) with the specific location, and adaptively determining the specific distance based on the POI. An embodiment includes adaptively determining the specific minimum time duration based on the POI. For an embodiment, at least one of the specific distance or the specific minimum time duration is determined by accessing a look up table based on the POI.

For at least some embodiments, the POI is defined as a specific point location or place that someone may find useful or interesting. There can be at least two types of POIs: public POIs (e.g. stores, parks) that one can obtain from POI database services, and personal POIs (e.g. home, friend's home) that are personal to a mobile user. As described, the specific distance and the specific minimum time duration can adaptively change based on an identified POI associated with the user stay. For example, the specific distance and the specific minimum time duration associated with a physically large POI (such as, a convention hall or sports stadium) can be quite different than the specific distance and the specific minimum time duration associated with physically small POI (such as, a small shop or residence).

For at least some embodiments, low-power sensor, such as accelerometer and passive low-level location data quality of location detecting, runs all the time to detect user's motion and cell tower location. When there is a significant change of motion movement, the network location listener are activated to monitor mid-level location change. The user may start to leave this place, or may just walk around inside the place. Both cases have the same motion pattern and accelerometer cannot tell the difference. However if the mid-level location changes, it indicates user (and the mobile device) has left the place, and the GPS is turned on for high-level data quality of location detecting. Once less movement is detected from motion sensors and stable WiFi network locations, the GPS is turned off and go back to mid-level location sensors or further to low-level location sensors.

Mid-level location change doesn't mean that user has definitely left the place. Random noise can also lead to mid-level location change. At least some embodiments include combining both mid-level location signal and motion movement signal to turn on GPS accurately and reduce the false alarm rates.

For at least some embodiment, the mobile device 300 is operative to establish a wireless connection to a WAP 360 or a cell tower 370 through a transceiver 340. Through at least one of the wireless connections, the controller is operative to establish an electronic connection to an up stream server 390.

Again, referring to FIG. 3, as shown, the mobile device 300 includes one or more lowest-power location-related sensors 310, one or more medium-power location-related sensors 312, and a controller 320. For at least some embodiments, the controller 320 and/or the upstream server 390 are operative to activate at least one of the lowest-power location-related sensors of the mobile device at power up of the mobile device, activate medium-power location-related sensors of the mobile device upon detection of motion of the mobile device and/or a change in a wireless connection to the mobile device. The controller 320 is interfaced with memory 330. For an embodiment, the memory 330 includes multilevel control logic 332 per the described embodiments, system wakeup 334 of described embodiments, and timer tasks 336 of described embodiments.

For an embodiment, the change in the wireless connection includes a change in cell tower identification. For an embodiment, the change in the wireless connection comprises a change in a wireless access point (WAP) connection. For an embodiment, the change in a wireless access point (WAP) connection includes at least one of the mobile devices obtaining a WiFi (Wireless Fidelity) connection, the mobile device losing a WiFi connection, or the mobile device changing from one WiFi connection to another WiFi connection. Again, the WiFi connection can be identified through the MAC address and the BSSID of the WiFi access point.

For at least some embodiments, the controller is further operative to activate at least one highest-power location-related sensors of the mobile device upon detection of sensed signals of the lowest-power sensors and signals of the medium-power sensors exceeding predetermined thresholds. For an embodiment, exceeding the predetermined thresholds includes sensing a motion detection signal having a level greater than a threshold, thereby indicating motion of greater than a predetermined amount. For an embodiment, exceeding the predetermined thresholds includes sensing a rate of change of received cell tower or WiFi signal change—that is, for example, cell tower location rate of change, or WiFi BSSID rate of change. That is, cell tower id's of cell towers changing at a rate, or BSSIDs of WAPs changing at a rate.

At least some embodiments include the controller being operative to switch from system sleeping mode to system waking up mode upon detection of motion of the mobile device or a change in cell tower identification for timer-based running tasks used in sensing medium-power sensors. As previously described, at least some embodiments include a device "awake" mode and a device "sleep" mode. During the awake mode, the sampling of the location-related sensors is both more accurate and more reliable. The higher the frequency of sampling, the more accurate the samples are. The reliability is influenced or based on the standard deviation of the sampling frequency.

At least some embodiments include motion sensors, and wherein detection of motion comprises the motion sensors generating sensed motion signals greater than a threshold. For an embodiment, the motion sensors detect whether mobile device is stationary or not—if not, then mobile device is put in the wake up mode.

At least some embodiments include a wireless transceiver, wherein the change of cell tower identification indicates that the mobile device has changed cell towers in which the transceiver of the mobile device is receiving wireless signals. For at least some embodiments, detecting a WiFi (WAP) connection/disconnect or cell tower disconnect or change indicates the mobile device is leaving a place or POI.

For an embodiment, the lowest-power location-related sensors comprise at least one of accelerometers or mobile cell tower identifiers. As previously described, the cell tower identifies include processing of signals received from the cellular towers to determine identifiers of the cell tower in which the cellular signals are received.

For an embodiment, the medium-power location-related sensor comprises WiFi network location listener processing or WiFi access point signal detection processing. As previously described, the processing can occur at the mobile device and/or at an upstream server the mobile device is electronically connect to. In some situations, this processing is being performed for other reasons, and the location-related processing piggy backs on the already being processing already being performed.

For an embodiment, the controller is further operative to activate highest-power location-related sensors of the mobile device upon detection of sensed signals of the lowest-power sensors and signals of the medium-power sensors exceeding predetermined thresholds.

As previously described, for an embodiment, the highest-power location-related sensor includes GPS sensors.

For an embodiment, the controller is further operative to de-activate the highest-power location-related sensors upon detection of motion less than a threshold.

For an embodiment, the controller is further operative to de-activate the highest-power location-related sensors upon detection stability (at a threshold level of stability) in reception of WiFi access point signals. For at least some embodiments, determination of the stability includes monitoring a changing rate of BSSIDs. For an embodiment, detected stability includes the BSSIDs changing rate less than a threshold rate—thereby indicating stability in the location changing of the mobile device.

For an embodiment, the controller is further operative to de-activate the highest-power location-related sensors upon detection stability—indicating the mobile device is not changing location greater than a threshold—say 200 meters—which can be dependent on a size of identified POI.

Figure 4:
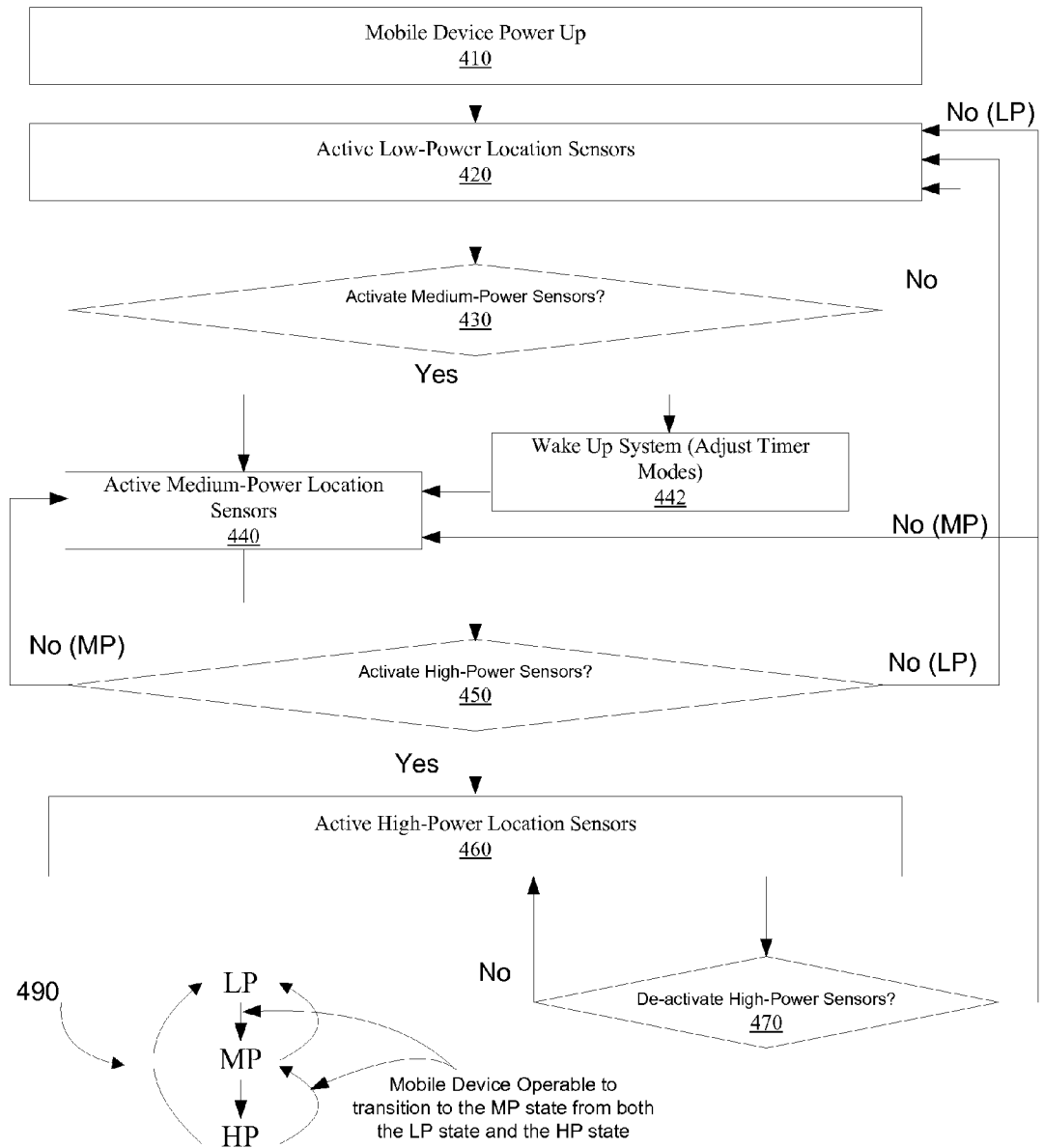
FIG. 4 is a flow chart that includes steps of a method of controlling activation of location-related sensors of a mobile device, according to an embodiment.

FIG. 4 is a flow chart that includes steps of a method of controlling activation of location-related sensors of a mobile device, according to an embodiment. A first step 410 includes powering up the mobile device. A second step 420 includes activating the low-power located-related sensors of the mobile device. As previously described, for at least some embodiments the low-power located-related sensors include motion sensors, cell tower identifies, and/or WAP (such as, WiFi) BSSID identifiers. A third step 430 includes determining whether to activate the medium power location-related sensors. A fourth step 440 includes activating the medium power location-related sensors or processing if it was determined at step 430 that the medium power location-related sensors or processing should be activated. In addition, a wake up system (adjust timer modes) step 442 is performed. This step includes the previously described embodiments for setting the sampling frequency of the sampling of the location-related sensing and the reliability of the sensing. A fifth step 450 includes determining whether to activate the high-power location-related sensors. If no, the medium power sensing of step 430 is re-executed while the medium-power location-related sensors are maintained. If yes, a sixth step 460 includes activating the high-power location-related sensors. A seventh step 470 includes monitoring the location-related sensors to determine whether to maintain the high-power location-related sensors and sensing, or whether to transition to the medium power sensors or sensing, or the transition to the low-power sensors or sensing.

A low power (LP), medium power (MP) and high power (HP) flow diagram 490 depicts the possible sequences of the different power consuming states. The LP state can transition to the MP state. The MP state can transition to the HP state. However, the HP state can transition to the MP state or the LP state. Note that the LP state cannot directly transition to the HP state. The logic behind this sequence is that for at least some embodiments, the processing of the location-related information of the location-related sensor is greater for the high-power location-related sensor test of step 450. As a result, this test is provided with substantially more information. The greater amount of information allows for a more accurate determination of what the proper state the mobile device should be in.

Figure 5:
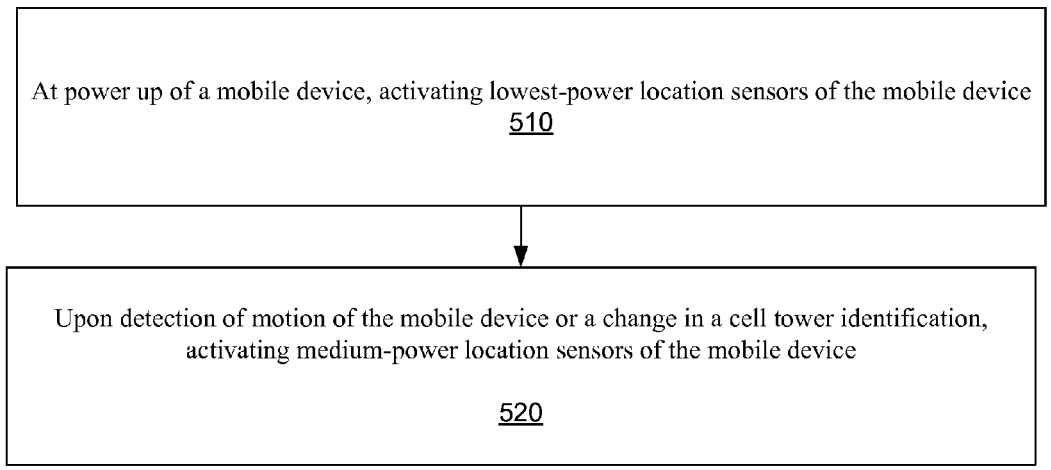
FIG. 5 is another flow chart that includes steps of a method of controlling activation of location-related sensors of a mobile device, according to an embodiment.

FIG. 5 is another flow chart that includes steps of a method of controlling activation of location-related sensors of a mobile device, according to an embodiment. A first step 510 includes activating lowest-power location-related sensors of the mobile device at power up of a mobile device. A second step 520 includes activating medium-power location-related sensors of the mobile device upon detection of motion of the mobile device and/or a change in a wireless connection to the mobile device. A least some embodiments further include activating at least one highest-power location-related sensors of the mobile device upon detection of sensed signals of the lowest-power sensors and signals of the medium-power sensors exceeding predetermined thresholds.

Although specific embodiments have been described and illustrated, the embodiments are not to be limited to the specific forms or arrangements of parts so described and illustrated.

What is claimed:
1. A mobile device, comprising:
one or more lowest-power location-related sensors;
one or more medium-power location-related sensors; and
a controller operative to:
  activate at least one of the lowest-power location-related sensors of a low power state of the mobile device at power up of the mobile device, wherein the lowest-power location-related sensors include motion sensors;
  activate medium-power location-related sensors of a medium-power state of the mobile device upon detection of a change in a wireless connection to the mobile device;
  activate at least one highest-power location-related sensors of a high-power state of the mobile device upon detection of sensed signals of the lowest-power sensors and signals of the medium-power sensors exceeding predetermined thresholds, and deactivate the highest-power location-related sensors upon detection of motion of the mobile device of less than a threshold;

wherein at least one of the medium-power location-related sensors or high-power location-related sensors include a lowest-power location-related sensor operating with a sampling rate that is greater than a threshold; wherein the mobile device is operable to transition to the low-power state from the medium-power state, and operable to transition to the low-power state from the high-power state, and operable to transition to the medium-power state from both the low-power state and the high power state.

2. The mobile device of claim 1, wherein activating the medium-power location-related sensors of the mobile device further includes detection of a change in motion of the mobile device.

3. The mobile device of claim 2, further comprising upon detection of motion of the mobile device or a change in a cell tower identification, the controller operative to switch from system sleeping mode to system waking up mode for timer-based running tasks used in sensing medium-power sensors.

4. The mobile device of claim 2, wherein detection of motion comprises the motion sensors generating sensed motion signals greater than a threshold.

5. The mobile device of claim 1, wherein the change in the wireless connection comprises a change in a cell tower identification.

6. The mobile device of claim 1, wherein the change in the wireless connection comprises a change in a wireless access point (WAP) connection.

7. The mobile device of claim 6, wherein the change in a wireless access point (WAP) connection comprises at least one of the mobile device obtaining a WiFi (Wireless Fidelity) connection, the mobile device losing a WiFi connection, or the mobile device changing from one WiFi connection to another WiFi connection.

8. The mobile device of claim 6, further comprising a wireless transceiver, wherein the change of cell tower identification indicates that the mobile device has changed cell towers in which the transceiver of the mobile device is receiving wireless signals.

9. The mobile device of claim 1, wherein conditional requirements of the location related information or location information is harder to meet in order for the mobile device to transition from the high-power state to the low-power state, than conditional requirements of the location related information or the location information to transition from the medium-power state to the low-power state.

10. The mobile device of claim 1, wherein the lowest-power location-related sensors further comprise mobile cell tower identifiers.

11. The mobile device of claim 1, wherein the medium-power location-related sensor comprise WiFi network location listener processing or WiFi access point signal detection processing.

12. The mobile device of claim 1, wherein the highest-power location-related sensors comprise GPS sensors.

13. The mobile device of claim 1, wherein a POI (point of interest) or place determination of a user of the mobile device influences activation of the lowest-power location-related sensors, the medium-power location-related sensors, and the high-power location-related sensors.

14. A method of selecting which of a plurality of sensors to use for location detection, comprising:

activating lowest-power location-related sensors of a low power state of a mobile device at power up of the mobile device, wherein the lowest-power location-related sensors include motion sensors;

activating medium-power location-related sensors of a medium-power state of the mobile device upon detection of a change in a wireless connection to the mobile device;

activating at least one highest-power location-related sensors of the mobile device of a high-power state upon detection of sensed signals of the lowest-power sensors and signals of the medium-power sensors exceeding predetermined thresholds, and deactivate the highest-power location-related sensors upon detection of motion of the mobile device of less than a threshold;

wherein at least one of the medium-power location-related sensors or high-power location-related sensors include a lowest-power location-related sensor operating with a sampling rate that is greater than a threshold; wherein the mobile device is operable to transition to the low-power state from the medium-power state, and operable to transition to the low-power state from the high-power state, and operable to transition to the medium-power state from both the low-power state and the high power state.

15. The method of claim 14, wherein conditional requirements of the location related information or location information is harder to meet in order for the mobile device to transition from the high-power state to the low-power state, than conditional requirements of the location related information or the location information to transition from the medium-power state to the low-power state.

16. A wireless location system, comprising:

an upstream server;

a mobile device electronically connected to the upstream server, the mobile device, comprising:

a controller;

one or more lowest-power location-related sensors;

one or more medium-power location-related sensors;

one or more highest-power sensors; wherein at least one of the upstream server and the controller are operative to:

activate at least one of the lowest-power location-related sensors of a low power state of the mobile device at power up of the mobile device, wherein the lowest-power location-related sensors include motion sensors;

activate medium-power location-related sensors of a medium-power state of the mobile device upon detection of a change in a wireless connection to the mobile device;

activate at least one highest-power location-related sensors of the mobile device of a high-power state upon detection of sensed signals of the lowest-power location-related sensors and signals of the location-related medium-power sensors exceeding predetermined thresholds, and deactivate the highest-power location-related sensors upon detection of motion of the mobile device of less than a threshold;

wherein at least one of the medium-power location-related sensors or high-power location-related sensors include a lowest-power location-related sensor operating with a sampling rate that is greater than a threshold; wherein the mobile device is operable to transition to the low-power state from the medium-power state, and operable to transition to the low-power state from the high-power state, and operable to transition to the medium-power state from both the low-power state and the high power state.

17. The system of claim 16, wherein conditional requirements of the location related information or location information is harder to meet in order for the mobile device to transition from the high-power state to the low-power state, than conditional requirements of the location related information or the location information to transition from the medium-power state to the low-power state.

18. A wireless location system, comprising:
an upstream server;
a mobile device electronically connected to the upstream server, the mobile device, comprising:
 a controller;
 one or more lowest-power location-related sensors;
 one or more medium-power location-related sensors;
 one or more highest-power sensors; wherein
at least one of the upstream server and the controller are operative to:
 activate at least one of the lowest-power location-related sensors of a low power state of the mobile device at power up of the mobile device, wherein the lowest-power location-related sensors include motion sensors;
 activate medium-power location-related sensors of a medium-power state of the mobile device upon detection of a detection of a change in motion of the mobile device;
 activate at least one highest-power location-related sensors of the mobile device of a high-power state upon detection of sensed signals of the lowest-power sensors and signals of the medium-power sensors exceeding predetermined thresholds, and deactivate the highest-power location-related sensors upon detection of motion of the mobile device of less than a threshold;
wherein at least one of the medium-power location-related sensors or high-power location-related sensors include a lowest-power location-related sensor operating with a sampling rate that is greater than a threshold; wherein
the mobile device is operable to transition to the low-power state from the medium-power state, and operable to transition to the low-power state from the high-power state, and operable to transition to the medium-power state from both the low-power state and the high power state.

* * * * *